Sept. 5, 1933. C. C. WILSON Re. 18,936

VOLTAGE TRANSFORMING APPARATUS FOR DIRECT CURRENT

Original Filed April 25, 1930

INVENTOR.
Chester C. Wilson,
BY
Hood & Hahn.
ATTORNEYS

Reissued Sept. 5, 1933

Re. 18,936

UNITED STATES PATENT OFFICE 18,936

VOLTAGE TRANSFORMING APPARATUS FOR DIRECT CURRENT

Chester C. Wilson, Alexandria, Ind.

Original No. 1,900,215, dated March 7, 1933, Serial No. 447,404, April 25, 1930. Application for reissue May 8, 1933. Serial No. 669,887

7 Claims. (Cl. 171—97)

This invention relates to transforming apparatus for direct current. More particularly it relates to apparatus for producing direct current at relatively high voltage from a direct current supply of relatively low voltage. The invention is particularly adapted for radio apparatus but is equally applicable to other uses.

The principal object of the present invention is to provide apparatus by means of which a high voltage direct current may be obtained directly from a low voltage direct current supply such as the common form of three cell, six volt storage battery or a farm lighting system operating upon low voltage direct current.

One feature of the invention resides in the provision of a transformer having its primary winding connected directly to the low voltage direct current supply and having its secondary winding connected to a rectifying device, together with means for repeatedly interrupting the primary circuit whereby high voltage alternating current is produced in the secondary circuit and rectified by the rectifying device to produce a high voltage direct current.

Another feature of the invention resides in the specific form of interrupting device and associated apparatus which is constructed to give practically no arcing at the interrupting points and is so shielded as to give a minimum amount of interference with the reception of signals by a radio receiver.

Another feature of the invention resides in the specific form of circuit and connections for the rectifying device whereby the highest possible voltage is secured therefrom.

Figure 1:
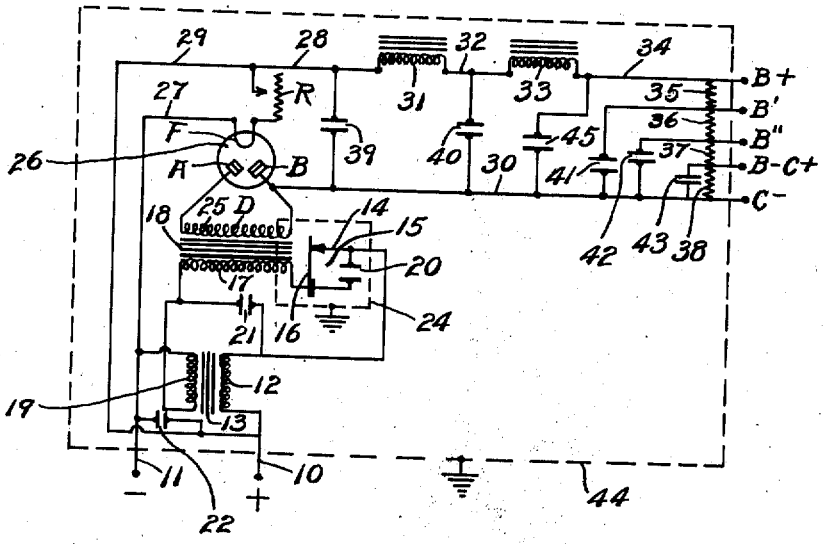
Figure 2:
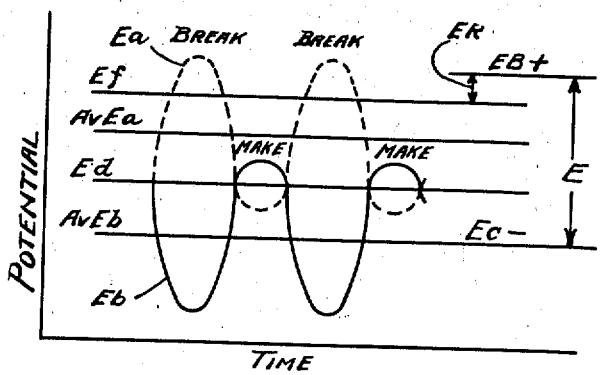

Other objects of the invention will be understood from the accompanying drawing and the following description and claims:

Fig. 1 is a diagrammatic representation of the apparatus involved and the wiring connections thereto; and Fig. 2 is a diagrammatic chart for comparison of the voltages at different parts of the apparatus.

In Fig. 1 a pair of terminals 10 and 11 are connected to the positive and negative terminals respectively of a suitable low voltage direct current supply. The terminal 10 is connected to a winding 12 of a choke coil 13, the opposite terminal of which is connected to the stationary point 14 of an interrupter device 15. The moving point 16 of said interrupter device is connected to the primary winding 17 of a transformer 18. The opposite terminal of the primary winding is connected to a second winding 19 of the choke coil 13. The winding 19 is in reversed relation to the winding 12 as illustrated in the diagram. The opposite terminal of the winding 19 is connected to the terminal 11. A condenser 20 is directly connected across the break points 14 and 16 of the interrupter. A pair of condensers 21 and 22 are connected as illustrated in the diagram Fig. 1. The interrupter 15 is surrounded by a metallic shield 24 grounded as indicated. The interrupter point 16 is adapted to be moved to break its contact with point 14 when the core of transformer 18 is energized by the energizing of the primary winding 17. This movement of the point 16 breaks the primary circuit, deenergizing the primary winding 17 and allowing the point 16 to return to its contact with point 14. The interrupter, therefore, functions in a well known manner for repeatedly making and breaking the primary circuit.

The secondary winding 25 of the transformer 18 has each of its terminals directly connected to one of the plate electrodes A and B of a thermionic rectifier tube 26. The said rectifier tube also contains a filament F, one terminal of which is connected to the terminal 11 by a wire 27. The opposite terminal of the filament F is connected to a resistance R in turn connected by a wire 29 to the terminal 10. Thus the filament F is heated by the low voltage direct current supply and its temperature may be adjusted by adjustment of the resistance R.

The plate B is connected by a wire 30 to a terminal C—. The resistance R is connected by a wire 28 to one terminal of a choke coil 31, the opposite terminal of which is connected by a wire 32 to one terminal of a choke coil 33. The opposite terminal of the coil 33 is connected by a wire 34 to a terminal B+. A resistance unit 35 is connected between the terminal B+ and a terminal B′. A resistance unit 36 is connected between the terminal B′ and a terminal B″. A resistance unit 37 is connected across the terminal B″ and a terminal B—C+. A resistance unit 38 is connected across the terminal B—C+ and the terminal C—. A condenser 39 is connected between the wires 28 and 30. A condenser 40 is connected between the wires 32 and 30. A condenser 45 is connected across the wires 30 and 34. A condenser 41 is connected between the wire 30 and the terminal B′. A condenser 42 is connected between the wire 30 and the terminal B″. A condenser 43 is connected between the terminal B—C+ and the wire 30. The entire apparatus so far described is covered by a metallic shield 44 grounded as indicated.

The repeated interruption of the primary circuit of transformer 18 by the interrupter 15 causes an induced electromotive force in the secondary winding 25 which is impressed upon the plates A and B. As one of the plates comes to a higher potential than the filament F, a flow of electrons takes place from the heated filament to the high potential plate tending to reduce the potential of the said plate. The electrons so discharged upon the plate B escape by means of the wire 30, the resistance units 38, 37, 36, 35, wire 34, choke coil 33, wire 32, choke coil 31, wire 28, resistance R to the filament F. This circuit may be termed the "high voltage direct current circuit." Electrons discharged upon the plate A escape through the windings 25 to the wire 30 and thereafter follow a similar path. By this means a direct current is established in the circuit just described and the average potential of the plates A and B is lowered sufficiently to give the required electromotive force for the passage of said current. The current so produced is a fluctuating current having a frequency equal to that of the vibration of the interrupter point 16. However, the introduction of the choke coils 31 and 33 and the condensers 39 to 43 inclusive, tend to reduce the said current to a substantially constant value. The potential difference obtained by this method between the wires 30 and 34 is greatly in excess of the potential difference between terminals 10 and 11.

In the operation of multi-stage radio receiving apparatus, it is desirable that certain of the amplifier plates be carried at higher voltages than others and that certain of the amplifier grids be carried at a negative voltage with respect to the filaments. By the use of the terminals B+, B′, B″, B—C+ and C— and the suitable choice of resistance 35 to 38 inclusive, suitable voltages may be obtained for each of the plates and grids.

In the making and breaking of the primary circuit I have found that the rate of change of primary current is greater at the "break" of the circuit than at the "make". Therefore, the voltage induced in the secondary winding 25 is greater at the break than at the make. By the use of the condenser 20 this effect is greatly accentuated and by the connections heretofore described I take advantage of the fact to obtain from the rectifier the maximum possible direct current voltage. This will be apparent from a study of the chart, Fig. 2. In this chart, potential is plotted as the ordinate with time as the abscissa. The line E*d* indicates the potential of the mid-point D of the secondary winding 25 of the transformer 18. The curve E*a* indicates the potential impressed upon the plate A by the making and breaking of the primary circuit. The curve E*b* indicates the potential similarly impressed upon the plate B. The line A*v*E*a* represents the average value of the potential E*a*. The line A*v*E*b* indicates the average value of the potential E*b*. The difference in the induced potential at the break and make of the primary circuit is illustrated in Fig. 2 by the greater amplitude of the potentials E*a* and E*b* in the portion of the curves marked "break" and results in a much lower average value for the potential of plate B than for the potential of plate A. By connecting the wire 30 to the plate B instead of to plate A or the mid-point D, a much greater potential difference is obtained in the high voltage direct current circuit. This connection is one of the most important features of the invention.

In Fig. 2 the line E*f* indicates the potential of the filament F and the dimension ER indicates the potential drop through the resistance R. In a farm lighting system, the voltage available is ordinarily approximately 32 volts while that required to heat the filament F is usually no more than 5 volts. The potential drop through the resistance R, therefore, is approximately 27 volts. By connecting the line 28 to the high potential terminal of the resistance R as herein described, the potential difference ER is added to that obtainable between the terminals B+ and C—.

This connection of the line 28 and the connection of the line 30 to plate B, therefore, gives the maximum potential difference across the terminals B+ and C—. This potential difference is indicated in Fig. 2 by the dimension E. Any other connection of lines 28 and 30 would give a lesser potential difference.

The use of the choke coil 13 prevents self induced fluctuations in voltage, in the primary coil 17, from being impressed upon the terminals 10 and 11. Thus, no disturbance due to the rapid making and breaking of the primary current passes beyond the grounded shield 44 and the current passing through terminals 10 and 11 is substantially a constant direct current. By the use of the condensers 20, 21 and 22 arcing at the points 14 and 16 is reduced to a minimum. The shielding of the interrupter, by shield 24, and the additional shielding of the entire transforming apparatus by shield 44 reduces possible interference with radio reception. In practice it has been found that no appreciable interference is produced.

I claim as my invention:

1. Transforming apparatus for producing a high voltage direct electromotive force from a relatively low voltage direct current supply including a transformer having primary and secondary windings, a source of low voltage direct current, a primary electrical circuit including said current source and said primary winding, means for repeatedly interrupting the current flow in said primary circuit for inducing an alternating electromotive force in said secondary winding, said electromotive force at the breaking of said circuit being unequal to that at the making thereof, whereby one terminal of said winding reaches a lower average potential than the other, a thermionic rectifier, a plate electrode in said rectifier connected to each of the terminals of said secondary winding, a heated filament in said rectifier for reducing the average potential of said plates by electronic flow from said filament to said plates, an electrical circuit connecting said filament to the secondary winding terminal having the lowest average potential and to its associated plate electrode, and resistance elements included in said circuit for resisting electronic flow therethrough whereby a relatively high direct electromotive force is established in said circuit.

2. Transforming apparatus for producing a high voltage direct electromotive force from a relatively low voltage direct current supply including a transformer having primary and secondary windings, a source of low voltage direct current, a primary electrical circuit including said current source and said primary winding, means for repeatedly interrupting the current flow in said primary circuit for inducing an alternating electromotive force in said secondary winding, said electromotive force at the breaking of said circuit being unequal to that at the making thereof, whereby one terminal of said winding reaches a lower average potential than the other, a thermionic rectifier, a plate electrode in said rectifier connected to each of the terminals of said secondary winding, a heated filament in said rectifier for reducing the average potential of said plates by electronic flow from said filament to said plates, and an electrical circuit connecting said filament to the secondary winding terminal having the lowest average potential and to its associated plate electrode.

3. Transforming apparatus including a thermionic rectifier, a pair of plate electrodes therein, a heated filament electrode therein for electronic emission, apparatus actuatable by a low voltage direct current to impress a relatively high alternating potential upon said plate electrodes, said apparatus maintaining a lower average potential on one of said plates than on the other, and an external electrical circuit including said filament and the low potential plate electrode.

4. Transforming apparatus including a thermionic rectifier, a pair of plate electrodes therein, a filament electrode therein adapted to be heated for electronic emission, a source of direct current for heating said filament, a resistance element interposed between said filament and the high potential terminal of said current supply source, apparatus actuable by a low voltage direct current to impress a relatively high alternating potential upon said plate electrodes, and an electrical circuit connecting one of said plate electrodes and the high potential terminal of said resistance unit.

5. Transforming apparatus for producing a high voltage direct electromotive force from a relatively low voltage direct current supply including a transformer having primary and secondary windings, a source of low voltage direct current, a primary electrical circuit including said current source and said primary winding, means for repeatedly interrupting the current flow in said primary circuit for inducing an alternating electromotive force in said secondary winding, said electromotive force at the breaking of said circuit being unequal to that at the making thereof, whereby one terminal of said winding reaches a lower average potential than the other, a thermionic rectifier, a plate electrode in said rectifier connected to each of the terminals of said secondary winding, a heated cathode in said rectifier for reducing the average potential of said plates by electronic flow from said cathode to said plates, an electrical circuit connecting said cathode to the secondary winding terminal having the lowest average potential, and resistance elements included in said circuit for resisting electronic flow therethrough whereby a relatively high direct electromotive force is established in said circuit.

6. Transforming apparatus for producing a high voltage direct electromotive force from a relatively low voltage direct current supply including a transformer having primary and secondary windings, a source of low voltage direct current, a primary electrical circuit including said current source and said primary winding, means for repeatedly interrupting the current flow in said primary circuit for inducing an alternating electromotive force in said secondary winding, said electromotive force at the breaking of said circuit being unequal to that at the making thereof, whereby one terminal of said winding reaches a lower average potential than the other, a thermionic rectifier, a plate electrode in said rectifier connected to each of the terminals of said secondary winding, a heated cathode in said rectifier for reducing the average potential of said plates by electronic flow from said cathode to said plates, and an electrical circuit connecting said cathode to the secondary winding terminal having the lowest average potential.

7. Transforming apparatus including a thermionic rectifier, a pair of plate electrodes therein, a heated cathode electrode therein for electronic emission, apparatus actuatable by a low voltage direct current to impress a relatively high alternating potential upon said plate electrodes, said apparatus maintaining a lower average potential on one of said plates than on the other, and an external electrical circuit including said cathode and the low potential secondary winding terminal.

CHESTER C. WILSON.